United States Patent
Lem et al.

(10) Patent No.: US 8,408,641 B2
(45) Date of Patent: Apr. 2, 2013

(54) PASSIVELY AIR-CONDITIONED MOTOR VEHICLE SEAT

(75) Inventors: Jeroen Lem, Maastricht (NL); Karl Michael Siebertz, Aldenhoven (DE); Carsten Starke, Vaals (NL)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 12/986,396

(22) Filed: Jan. 7, 2011

(65) Prior Publication Data

US 2011/0169318 A1 Jul. 14, 2011

(30) Foreign Application Priority Data

Jan. 11, 2010 (DE) .......................... 10 2010 000 762

(51) Int. Cl.
*A47C 7/74* (2006.01)

(52) U.S. Cl. ............................... 297/180.13; 297/180.14

(58) Field of Classification Search ............. 297/180.13, 297/180.14; 5/81.1 H S, 81.1 R, 652.1, 724, 5/725, 726

See application file for complete search history.

(56) References Cited

U.S. PATENT DOCUMENTS

| | | | |
|---|---|---|---|
| 5,226,188 A | | 7/1993 | Liou |
| 5,590,428 A | * | 1/1997 | Roter .................... 297/180.13 X |
| 6,109,688 A | * | 8/2000 | Wurz et al. ............... 297/180.14 |
| 6,578,910 B2 | * | 6/2003 | Andersson et al. .. 297/180.13 X |
| 6,786,541 B2 | * | 9/2004 | Haupt et al. ......... 297/180.14 X |
| 7,918,498 B2 | * | 4/2011 | Bajic et al. ............ 297/180.13 X |
| 2004/0189061 A1 | * | 9/2004 | Hartwich et al. ........ 297/180.14 |
| 2005/0173950 A1 | * | 8/2005 | Bajic et al. ............... 297/180.14 |
| 2006/0249996 A1 | * | 11/2006 | Eberl et al. ............... 297/180.14 |

FOREIGN PATENT DOCUMENTS

| | | |
|---|---|---|
| DE | 1002464 B | 2/1957 |
| EP | 1389558 A1 | 2/2004 |

* cited by examiner

*Primary Examiner* — Rodney B White
(74) *Attorney, Agent, or Firm* — Shook Hardy & Bacon LLP

(57) ABSTRACT

The invention relates to a passively air-conditioned motor vehicle seat comprising a breathable seat cover and comprising a seat body which has ventilation channels extending in the thickness direction, which in each case have at least one element for preventing the return flow of air. For simplifying the production the at least one element for preventing the return flow of air consists of the same material as the seat body.

17 Claims, 1 Drawing Sheet

PASSIVELY AIR-CONDITIONED MOTOR VEHICLE SEAT

The invention relates to a passively air-conditioned seat, in particular a motor vehicle seat, and a method for the production thereof.

It is known to use air-conditioned seats in motor vehicles. Hitherto, actively air-conditioned seats have generally been used in which an active ventilation system conveys air through the seat in order to remove heat and moisture. To this end, the seat is provided with ventilation channels and the seat cover is air-permeable.

For energy-saving reasons, however, it is desirable in modern vehicles to use passively air-conditioned seats in which neither a ventilator nor an electronic control system is necessary.

One approach is the use of seats with an "open" structure, in which the air may be exchanged. In this case, the air exchange may be triggered by the movements of the respective occupant during travel, as the occupant moves up and down.

However, this movement is not sufficient to effect a complete exchange of air. Thus it has been considered to introduce check valves into the ventilation channels, so that the air is able to be exchanged gradually, rather than the air simply being moved to and fro.

A seat cushion or backrest cushion of a motor vehicle seat is disclosed in DE 100 02 464 C2, for example, which has a foamed core and at least one air duct extending in the core, as well as an air-permeable seat cover region, below which an air distribution layer is arranged, made of material which is air-permeable on all sides, and with an air-impermeable dividing layer between the core and the air distribution layer, the core which is foamed in situ being encased on all sides by an impermeable foam layer, and the air duct being formed by an inserted core tube extending from the impermeable foam rear layer to the air-impermeable front dividing layer, a plurality of core tubes also being able to be provided.

A breathable seat is disclosed, for example, in EP 1 389 558 B1, comprising: a seat body, which is formed from urethane foam and has ventilation holes which extend in the thickness direction of the urethane foam, the seat also comprising: a three-dimensional meshed cushion body which is incorporated in the region of the seat body supporting the body of the user, which has a three-dimensional mesh-like structure, in which a large number of continuous linear elements made of thermoplastic resin are looped windingly, so that the relevant contact regions thereof are joined together, and which communicates with the ventilation holes; and a seat cover which is breathable and encases the seat body and the three-dimensional cushion body. The ventilation holes may be provided with a check valve.

A seat cushion is disclosed, for example, in U.S. Pat. No. 5,226,188 in which a plurality of conical ventilation channels are provided in a cushion, the cushion having two opposing inclined sides and a flat base. The corresponding seat has a recess for receiving the cushion and a check valve which communicates with the recess, the recess also being provided with a plurality of conical ventilation channels, which communicate with one another.

Accordingly, it is the object of the invention to provide a passively air-conditioned seat, in particular for use in motor vehicles, which may be manufactured in a simple manner.

This object is achieved by the seat of the disclosed invention.

As the at least one element for preventing the return flow of air consists of the same material as the seat body, the manufacture may be substantially simplified, as there is no need to consider variations in material. Thus the processing is simplified; for example no variations in the material of the bond have to be considered. Advantageously, the at least one element for preventing the return flow of air not only consists of a similar material to the seat body but also the same material as the seat body.

Thus these elements may be formed in the same manufacturing process. In this manner, a heated mandrel may be withdrawn from the stiffened or the recently stiffened seat body material, in order to produce the parts of the element for preventing the return flow of air in the ventilation channels.

In the present case, a means is regarded as an element for preventing the return flow of air which either completely prevents the return flow of air, such as for example a check valve, or at least increases the resistance of the return flow of air to such an extent that, overall, air only flows in one direction, such as, for example, by means of inclined fibers, as in nature.

In a preferred embodiment, the at least one element for preventing the return flow of air is a check valve. This may be formed from a flap and a stop. The flap may, in turn, be formed from a flexible sheet protruding inwardly from the external wall of the respective ventilation channel, at an angle to the radius. The stop may, for example, be formed by a material projection in the ventilation channel.

In a further preferred embodiment of the invention, the at least one element for preventing the return flow of air may be formed by a plurality of peripheral material fibers protruding inwardly from the external wall of the respective ventilation channel, at an angle to the radius. These material fibers thus produce an increase in the resistance to the return flow of air, so that overall there is no return flow or hardly any return flow.

To this end, it is preferred if the material fibers are located in the axial direction of the ventilation channel at an angle in the desired air flow direction, i.e. they have a "nap", similar to fur. With the return flow of air, the material fibers provide increased resistance to the air.

Preferably, the material fibers are produced by a mandrel, which may also be heated, being withdrawn from the seat body material which is in the process of solidifying. This is particularly advantageous, as in this case the mandrels which are otherwise present in the injection-mold for the seat body during the solidification process are withdrawn from the solidifying seat body. Thus many elements preventing the return flow of air are created in the form of material fibers which all face in the pulling direction of the mandrel. Usually this would be an injection molding error, if the injection mold were opened too early and the seat body material were not yet solidified. In this case, this error is deliberately used to form the elements for preventing the return flow of air.

Further details and advantages of the invention are revealed from the following description of exemplary embodiments with reference to the drawings, in which:

FIG. 2b shows a section through the ventilation channel of FIG. 2a;

FIG. 3b shows a plan view of the ventilation channel of FIG. 3a.

Figure 1:
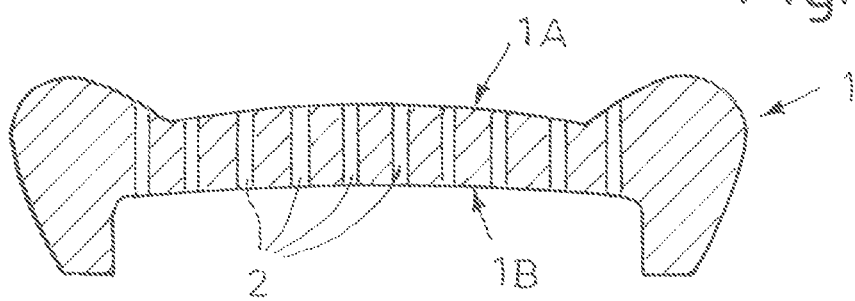
FIG. 1 shows a section through a seat body with ventilation channels.

A seat body denoted as a whole by 1 of a passively air-conditioned motor vehicle seat is shown in FIG. 1 schematically and in cross section. For simplification, only the molded part of the seat body 1 consisting of a plastic foam is shown, without a cover, etc. The seat body has a seat side 1A which faces the seat surface of the occupant and/or forms the seat surface and a remote base side 1B which faces toward the seat frame and/or the vehicle floor. The seat body 1 has a plurality of ventilation channels 2 extending in the thickness direction.

Figure 2A:
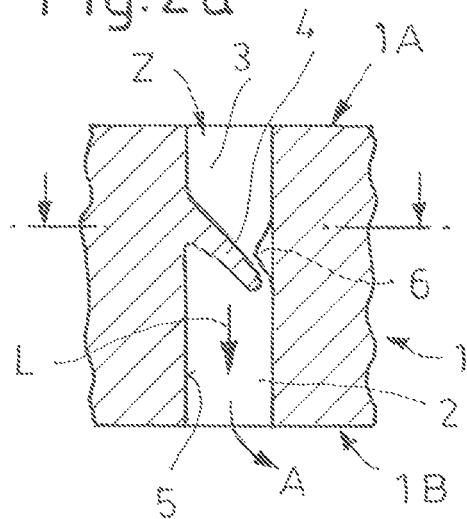
FIG. 2a shows an enlarged section through a ventilation channel of FIG. 1 with an element for preventing the return flow of air according to the invention as a check valve.
Figure 2B:
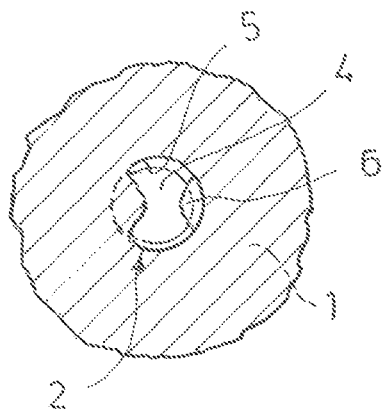

In FIG. 2a an enlarged section through a ventilation channel 2 of FIG. 1 is shown with an element for preventing the return flow of air according to the invention as a check valve 3. FIG. 2b shows a section through the ventilation channel of FIG. 2a. In this connection, the ventilation channel 2, as shown, has at least one check valve 3 which prevents a return flow of air. Also, according to the embodiment and depending on the thickness of the seat body 1, a plurality of check valves 3 may be present. Thus its combined effect is increased and a return flow of air is reliably prevented, so that air is transported by the movement of the occupant from the seat side 1A to the base side 1B.

The check valve 3 consists of a flap 4 which is formed by a flexible sheet protruding inwardly from the external wall 5 of the respective ventilation channel 2 at an angle to the radius. The sheet is thus located in the ventilation channel 2 obliquely in the thickness direction and namely so that in the axial direction of the ventilation channel 2 it is at an angle in the air flow direction L. The flap 4 is movably arranged on the external wall of the ventilation channel 2, but may also be deformed as the sheet is flexible.

If, as a result of a changing load of the seat body 1, the seat body is resiliently compressed, the volume of air in the air duct 2 is reduced. If the air duct 2 on the seat side 1a is closed by the occupant on the seat, the air in the air duct 2 may only escape through its lower opening on the base side 1B. The flap 4 provides only slight resistance to the extracted air A flowing out, as it is opened by the flow of extracted air A.

If the volume of air in the air duct 2 is increased as the occupant moves on the seat, air may only flow from above. If the incoming air were to flow from below in the direction of the seat side 1a, the flap 4 would close, as the air flow would then press it against the external wall 5 of the air duct 2. Additionally or alternatively, a stop 6 may be provided on the external wall 5, against which the flap 4 is pressed in the case of the incoming air flowing from below.

Both the flap 4 and the stop 6 consist of the same material as the seat body 1 and/or the foam material thereof. A plurality of flaps may be arranged in succession in one ventilation channel. A flap may also be in two parts or multiple parts, so that a plurality of segments of the flap is located on one plane in the ventilation channel.

Figure 3A:
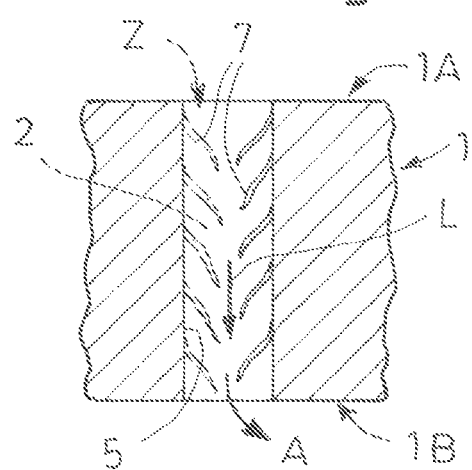
FIG. 3a shows an enlarged section through a ventilation channel of FIG. 1 with an element for preventing the return flow of air according to the invention made of material fibers.
Figure 3B:
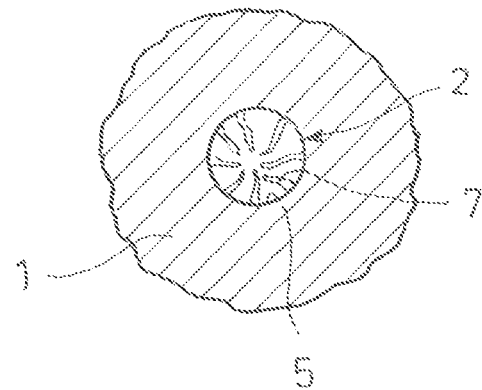

As a variant of the invention, FIG. 3a shows an enlarged section through a ventilation channel of FIG. 1 with the element for preventing the return flow of air according to the invention consisting of material fibers 7, and FIG. 3b shows a plan view of the ventilation channel of FIG. 3a.

The element for preventing the return flow of air consists of a plurality of peripheral material fibers 7, protruding inwardly from the external wall 5 of the respective ventilation channel 2, at an angle to the radius. The material fibers 7 are located in the axial direction of the ventilation channel at an angle in the air flow direction L, i.e., they have a "nap" similar to fur. These material fibers 7 produce, therefore, an increase in the resistance to the return flow of air to such an extent that overall there is no return flow or hardly any return flow.

Also, the material fibers 7 consist of the same material as the seat body 1 and/or the foam material thereof.

The invention is not limited to the examples shown. In particular, a seat body may have many ventilation channels, which all or partially have elements for preventing the return flow of air. The elements for preventing the return flow of air may allow air through in only one direction, either in the direction of the seat surface or in the direction counter to the seat surface. The elements for preventing the return flow of air may also be arranged in the different ventilation channels so that one portion of the ventilation channels allows the air through in the direction of the seat surface and the other portion of the ventilation channels allows the air counter to the direction of the seat surface. Also, different elements for preventing the return flow of air may also be arranged in one ventilation channel.

The seat according to the invention may be used for all known seat surfaces and backrests of seat arrangements provided for people. In addition to seats for vehicles of all types, these seats are also, in particular, useable in seating furniture in the domestic and commercial fields.

The invention claimed is:

1. A passively air-conditioned motor vehicle seat comprising a breathable seat cover and a seat body (1) made of a material, the seat body (1) having a ventilation channel (2) extending therethrough which has a check valve (3) for preventing the return flow of air, the check valve (3) consisting of the same material as the seat body (1), the ventilation channel (2) having an external wall (5) and the check valve (3) having a flap (4) movably mounted on the external wall (5) of the ventilation channel (2).

2. The seat as claimed in claim 1, wherein the flap (4) is formed by a flexible sheet protruding inwardly from the external wall (5) of the respective ventilation channel (2).

3. The seat as claimed in claim 2, wherein the ventilation channel has an axial direction and the flap (4) is located in the axial direction of the ventilation channel (2) at an angle in the air flow direction (L).

4. The seat as claimed in claim 2, wherein the ventilation channel has an axial direction and the flap (4) runs in the axial direction of the ventilation channel (2) against a stop (6) arranged on the external wall (5) of the ventilation channel (2).

5. The seat as claimed in claim 1, wherein the ventilation channel has an axial direction and the flap (4) is located in the axial direction of the ventilation channel (2) at an angle in the air flow direction (L).

6. The seat as claimed in claim 1, wherein the ventilation channel has an axial direction and the flap (4) runs in the axial direction of the ventilation channel (2) against a stop (6) arranged on the external wall (5) of the ventilation channel (2).

7. A passively air-conditioned motor vehicle seat comprising a breathable seat cover and a seat body (1) made of a material, the seat body (1) having a ventilation channel (2) extending therethrough which has a check valve (3) for preventing the return flow of air, the check valve (3) consisting of the same material as the seat body (1), wherein the ventilation channel (2) has an external wall (5) and wherein at least one element for the prevention of the return flow of air is formed form a plurality of peripheral material fibers (7) protruding inwardly from the external wall (5) of the respective ventilation channel (2).

8. The seat as claimed in claim 7, wherein the ventilation channel has an axial direction and the material fibers (7) are located in the axial direction of the ventilation channel (2) at an angle in the air flow direction (L).

9. A method for producing a seat as claimed in claim 1, wherein a heated mandrel is withdrawn from the seat body material.

10. The method for producing a seat as claimed in claim 9, wherein the mandrel is withdrawn from the seat body material which is in the process of solidifying.

11. The seat as claimed in claim 1, wherein the flap (4) is formed by a flexible sheet protruding inwardly from the external wall (5) of the respective ventilation channel (2).

12. A passively air-conditioned motor vehicle seat comprising a breathable seat cover and a seat body (1) made of a material, the seat body (1) having a ventilation channel (2) extending therethrough which has a check valve (3) for preventing the return flow of air, the check valve (3) consisting of the same material as the seat body (1), wherein the ventilation channel (2) has an external wall (5) and wherein the check valve (3) for the prevention of the return flow of air is formed from a plurality of peripheral material fibers (7) protruding inwardly from the eternal wall (5) of the respective ventilation channel (2).

13. The seat as claimed in claim 12, wherein the ventilation channel has an axial direction and the material fibers (7) are located in the axial direction of the ventilation channel (2) at an angle in the air flow direction (L).

14. The seat as claimed in claim 1, wherein the check valve (3) for the prevention of the return flow of air is formed form a plurality of peripheral material fibers (7) protruding inwardly from the external wall (5) of the respective ventilation channel (2).

15. A method for producing a seat as claimed in claim 1, wherein a heated mandrel is withdrawn from the seat body material.

16. The method for producing a seat as claimed in claim 15, wherein the mandrel is withdrawn form the seat body material which is in the process of solidifying.

17. The method for producing a seat as claimed in claim 15 wherein the mandrel is withdrawn form the seat body material which is solidified.

\* \* \* \* \*